US008425673B2

(12) United States Patent
Burke (10) Patent No.: US 8,425,673 B2
(45) Date of Patent: Apr. 23, 2013

(54) REGENERATIVE DRYERS WITH A BYPASS

(75) Inventor: Nicholas Edward Burke, Independence, MO (US)

(73) Assignee: Solution Dynamics, Paola, KS (US)

( * ) Notice: Subject to any disclaimer, the term of this patent is extended or adjusted under 35 U.S.C. 154(b) by 249 days.

(21) Appl. No.: 12/838,232

(22) Filed: Jul. 16, 2010

(65) Prior Publication Data

US 2012/0012005 A1   Jan. 19, 2012

(51) Int. Cl.
*B01D 53/04* (2006.01)
*B01D 53/26* (2006.01)

(52) U.S. Cl.
USPC ............................. 96/111; 96/121; 55/DIG. 17

(58) Field of Classification Search ............. 55/DIG. 17; 96/111, 121, 130; 95/10; 34/80, 472, 473
See application file for complete search history.

(56) References Cited

U.S. PATENT DOCUMENTS

| | | | | | |
|---|---|---|---|---|---|
| 4,127,395 | A | * | 11/1978 | McKey et al. ..................... 95/10 |
| 4,552,570 | A | * | 11/1985 | Gravatt ............................. 95/10 |
| 4,822,384 | A | * | 4/1989 | Kato et al. ....................... 96/110 |
| 4,971,610 | A | * | 11/1990 | Henderson ....................... 96/111 |
| 6,375,722 | B1 | * | 4/2002 | Henderson et al. ............. 96/112 |
| 7,000,332 | B1 | * | 2/2006 | Fresch et al. ..................... 34/330 |
| 7,279,026 | B1 | * | 10/2007 | Fresch et al. .................... 95/124 |
| 7,691,183 | B2 | * | 4/2010 | Vertriest ......................... 95/119 |

* cited by examiner

*Primary Examiner* — Frank Lawrence, Jr.
(74) *Attorney, Agent, or Firm* — Lathrop & Gage LLP (57) ABSTRACT

Regenerative air dryers are disclosed for feeding pressurized air with a controlled moisture content to a header. In one embodiment, a dryer comprises first and second chambers alternating between drying and regenerating phases. One of the chambers is at the drying phase while the other is at the regenerating phase. A controller is programmed to switch the phase of the chambers between drying and regenerating when the desiccant in the chamber at the drying phase has retained water to a predetermined capacity. A bypass line bypasses both chambers. An input provides air to the chamber at the drying phase and to the bypass line. A dew point feedback system controls a volume of air passing through the bypass line. Means are included for combining air from the bypass line with air exiting the chamber at the drying phase to provide air with a controlled dew point to the header.

9 Claims, 7 Drawing Sheets

FIG. 7

REGENERATIVE DRYERS WITH A BYPASS

BACKGROUND

The invention relates generally to the field of air dryers. More specifically, the invention relates to the field of regenerative air dryers employing a drying chamber and a regenerating chamber.

SUMMARY

The present invention is defined by the claims below. According to one embodiment, a moisture control system for pressurized air comprises a first and a second chamber which alternate between drying and regenerating phases. Only one of the chambers is at the drying phase at any given point in time. An input provides compressed air to the chamber at the drying phase. The moisture control system includes a bypass line passing air that does not go through the chamber at the drying phase. The air exiting the chamber at the drying phase is combined with the air from the bypass line to obtain air with a controlled moisture content for outputting.

According to another embodiment, a regenerative air dryer for feeding pressurized air with a controlled moisture content to a header comprises a first and a second chamber that alternate between regenerating and drying phases. One of the first and second chambers is at the drying phase while the other is at the regenerating phase. A controller is programmed to switch the phase of the chambers between drying and regenerating when desiccant in the chamber at the drying phase has retained water to a predetermined capacity. A bypass line bypasses both the first and the second chambers. An input provides air to the chamber at the drying phase and to the bypass line. A dew point feedback system controls a volume of air passing through the bypass line. Means are included for combining air from the bypass line with air exiting the chamber at the drying phase to provide air with a controlled dew point to the header.

According to yet another embodiment, a feedback system for use with a regenerative air dryer having two chambers alternating between drying and regenerative phases includes a sensor, a bypass line, and a controller. The sensor determines moisture content of air being outputted by the regenerative air dryer. The bypass line bypasses air around both chambers. The controller selectively opens and closes a control valve to allow air to pass through the bypass line. Means are included for combining air exiting the chamber at the drying phase with air from the bypass line to control the moisture content of the air being outputted by the regenerative dryer.

BRIEF DESCRIPTION OF THE SEVERAL VIEWS OF THE DRAWINGS

Illustrative embodiments of the present invention are described in detail below with reference to the attached drawing figures.

DETAILED DESCRIPTION

Embodiments of the present invention provide systems and methods for drying air with a regenerative air dryer. A system may require compressed air with a particular moisture content for one or more applications. At a given pressure and temperature, the moisture content of air can be described by the air's dew point, where the dew point is defined as the temperature to which a given parcel of air must be cooled at constant pressure for the water vapor in the air parcel to condense into liquid water. The dew point of an air parcel increases or decreases with a respective increase or decrease in the air parcel's moisture content. The dew point, therefore, can serve to gauge the moisture content of a given parcel of air. The regenerative air dryers disclosed herein may enable a system to receive air with a particular moisture content.

Figure 1:
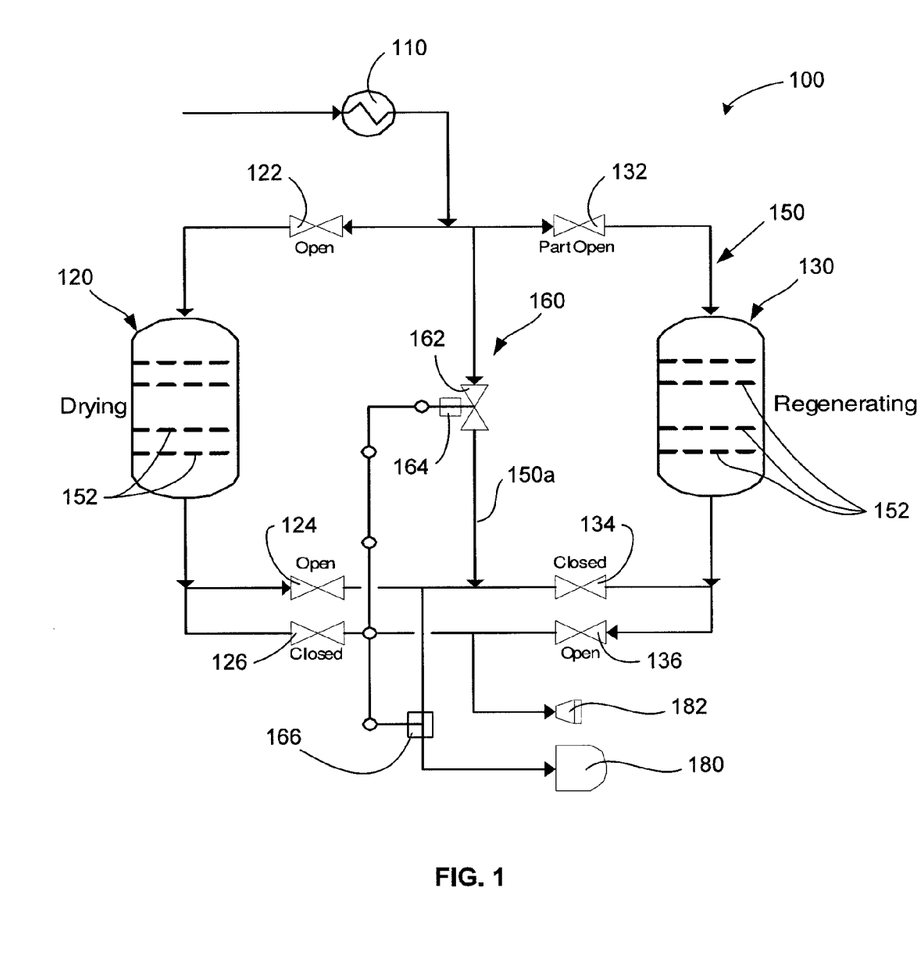
FIG. 1 is a schematic drawing outlining a regenerative air dryer with a dew point feedback system, according to an embodiment. Labels such as "open" and "closed" are used to illustrate one manner of operation.

FIG. 1 shows one embodiment of a regenerative air dryer 100, which may include a cooler 110, a drying chamber 120, a regenerating chamber 130, a network of pipes 150, and a dew point feedback system 160. Compressed air with an uncontrolled moisture content is generated by a compressor (not shown in FIG. 1) upstream of the cooler 110 and fed via the network of pipes 150 to the drying chamber 120 and the regenerating chamber 130; its moisture content is reduced below a set point; and it is ultimately fed into a system via a header 180.

A drying input control valve 122 and a regenerating input control valve 132 regulate the amount of air that enters into the drying and regenerating chambers 120, 130 respectively. The drying input control valve 122 may be fully open, as compared to the regenerating input control valve 132 which may only be partially open, thereby allowing a greater volume of air to flow into the drying chamber 120 as compared to the regenerating chamber 130. Both the drying and the regenerating chambers 120, 130 may contain an adsorbent desiccant 152. The adsorbent desiccant 152 can adsorb moisture from the air, and the desiccant's 152 ability to adsorb moisture decreases as it adsorbs more and more moisture, eventually coming to a point where the desiccant 152 can not adsorb more moisture. At that point, or at a time before or after the desiccant 152's ability to retain moisture is exhausted, the desiccant 152 can be regenerated (i.e., the moisture present on the desiccant 152 can be removed so that the desiccant 152 can again function to adsorb more moisture.)

Thus, in FIG. 1, moisture from the compressed air accumulates on the surface of the adsorbent desiccant 152 in the drying chamber 120 until the adsorbent desiccant's 152 ability to adsorb more moisture is diminished. While the drying chamber dries the compressed air, the smaller stream of compressed air entering the regenerating chamber 130 expands therein. Expansion of the smaller stream of air in the regenerating chamber 130 allows the air to absorb moisture from the regenerating chamber's 130 desiccant 152, thereby drying and regenerating the desiccant 152 in the regenerating chamber 130. The smaller stream of air can then be released into the atmosphere via a vent 182.

As is known in the art, the drying and the regenerating chambers 120, 130 are alternated; the drying chamber 120 dries air while the regenerating chamber 130 regenerates its desiccant 152, and subsequently, the chamber 120 regenerates its desiccant 152 while the chamber 130 dries the air. When the drying chamber 120 is drying, a drying output control valve 124 is kept open and the dried air is transferred to the system via the header 180, while a regenerating output control valve 134 is kept closed to ensure that the moisture laden stream of air does not enter the system. During this time, a regenerating vent control valve 136 is kept open so that moist air, after drying the desiccant 152 in the regenerating chamber 130, can escape into the atmosphere via the vent 182. A drying vent control valve 126 is kept closed to ensure that all the dried air enters the header 180 via the drier output control valve 124, and does not escape out of the vent 182.

When the ability of the desiccant 152 in the drying chamber 120 to retain moisture from the air is diminished, the roles of the drying and the regenerating chambers 120, 130 are reversed. Reversing the cycle involves switching the position of the drying input control valve 122 with the regenerating input control valve 132, the drying output control valve 124 with the regenerating output control valve 134, and the drying vent control valve 126 with the regenerating vent control valve 136. In other words, the drying control valves 122, 124, and 126 may be opened or closed to the same extent that their corresponding regenerating valves 132, 134, and 136 were open or closed, and vice versa.

Very notably, some of the compressed air from the compressor (not shown in FIG. 1) upstream of the cooler 110 may go to the dew point feedback system 160. The dew point feedback system 160 may contain a dew point control valve 162, a controller 164, and a sensor 166. The sensor 166 may be one or more dew point sensors, capable of determining dew points at compressed air pressures (pressure dew point). The sensor 166 senses the dew point of the air entering the header 180 and determines whether air with the requisite amount of moisture is entering the header 180. It is possible, and sometimes common, that the air entering the header 180 has a lower moisture content/dew point than the moisture content required by the system. In this situation, the controller 164 may send a signal to the dew point control valve 162 to open to a controlled level, thereby allowing a desired level of compressed, moisture laden air from the cooler 110 to bypass both chambers 120, 130, and via a pipe 150*a* in the network of pipes 150, mix with the air entering the header 180. More particularly, the air from pipe 150*a* may mix with the air entering the header 180 via the control valve 124 when chamber 120 is drying, while the air from pipe 150*a* may mix with the air entering the header 180 via control valve 134 when chamber 120 is regenerating. In this way, the dew point feedback system 160 may enable the dryer 100 to require less compressed air for the regenerating cycle, and the system to utilize less energy overall (such as discussed below regarding FIG. 7) while maintaining a controlled moisture content/dew point at the header 180.

Similarly, it is possible that the air exiting the drying chamber 120 (or the chamber 130) and entering the header 180 has an inconsistent amount of moisture, and therefore, an inconsistent dew point. The sensor 166 may take successive readings of the dew point of air entering the header 180. The controller 164 may then open or close the dew point valve 162 to varying degrees and allow moist air from the cooler 110 to mix with the air exiting the drying chamber 120 (or 130) so that the air entering the header 180 has a consistent dew point. The controller 164 may entirely close the dew point valve 162 where the air exiting the drying chamber 120 (or 130) has a dew point that is at a desired level for the header 180.

FIGS. 2-5 show alternate embodiments of the regenerative air dryer that are substantially similar to the embodiment 100 in FIG. 1, except as specifically noted and/or shown, or as would be inherent. For uniformity and brevity, corresponding reference numbers may be used to indicate corresponding parts in the various figures, though with any noted deviations. In embodiment 200 shown in FIG. 2, a low pressure blower 202 may be utilized to regenerate the desiccant 152 in the chamber 120 (or 130) instead of compressed air. Unlike FIG. 1, where the control valve 132 (or the control valve 122) of the regenerating chamber 120 (or 130) was partly open to allow a small volume of compressed air to regenerate the desiccant 152, the control valve 132 (or 122) in FIG. 2 remains fully closed during regeneration. The blower 202 may be connected to the drying, regenerating chambers 120, 130 with control valves 206 and 208 respectively. When the chamber 130 is in its regenerating cycle, the control valve 208 may be opened to allow air from the blower 202 to enter the chamber 130, wherein the air will expand and absorb the moisture from the desiccant 152. This moist air may then be let out of the vent 182 through the open control valve 136. The control valve 206 is kept closed to ensure that no air from the drying chamber 120 escapes through the low pressure blower system, and the control valve 126 is kept closed to ensure that no dried air exits the vent 182. Similarly, when the chamber 120 is regenerating, the control valve 208 is closed and the control valve 206 is opened, and the air from the blower 202 enters the chamber 120 and regenerates the desiccant 152, exiting through the now open control valve 126 and the vent 182.

Figure 2:
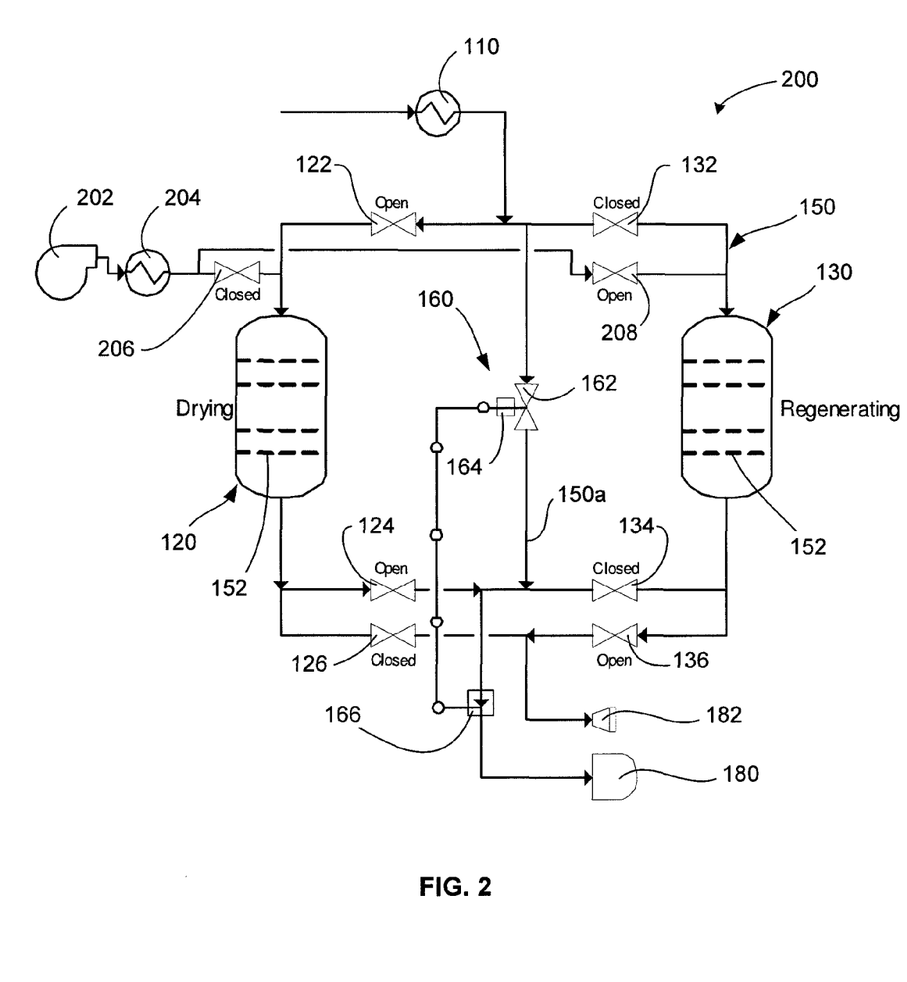
FIG. 2 is a schematic drawing outlining a regenerative air dryer with a blower and a dew point feedback system, according to another embodiment. Labels such as "open" and "closed" are used to illustrate one manner of operation.

As in FIG. 1, the dew point feedback system 160 in FIG. 2 may monitor the air entering the header 180 by the sensor 166, and open or close the control valve 162 to ensure that air with a constant, desired dew point enters the header 180. A heater 204 may be used along with the blower 202 to heat the air that will regenerate the desiccant 152 in the chambers 120, 130.

Figure 3:
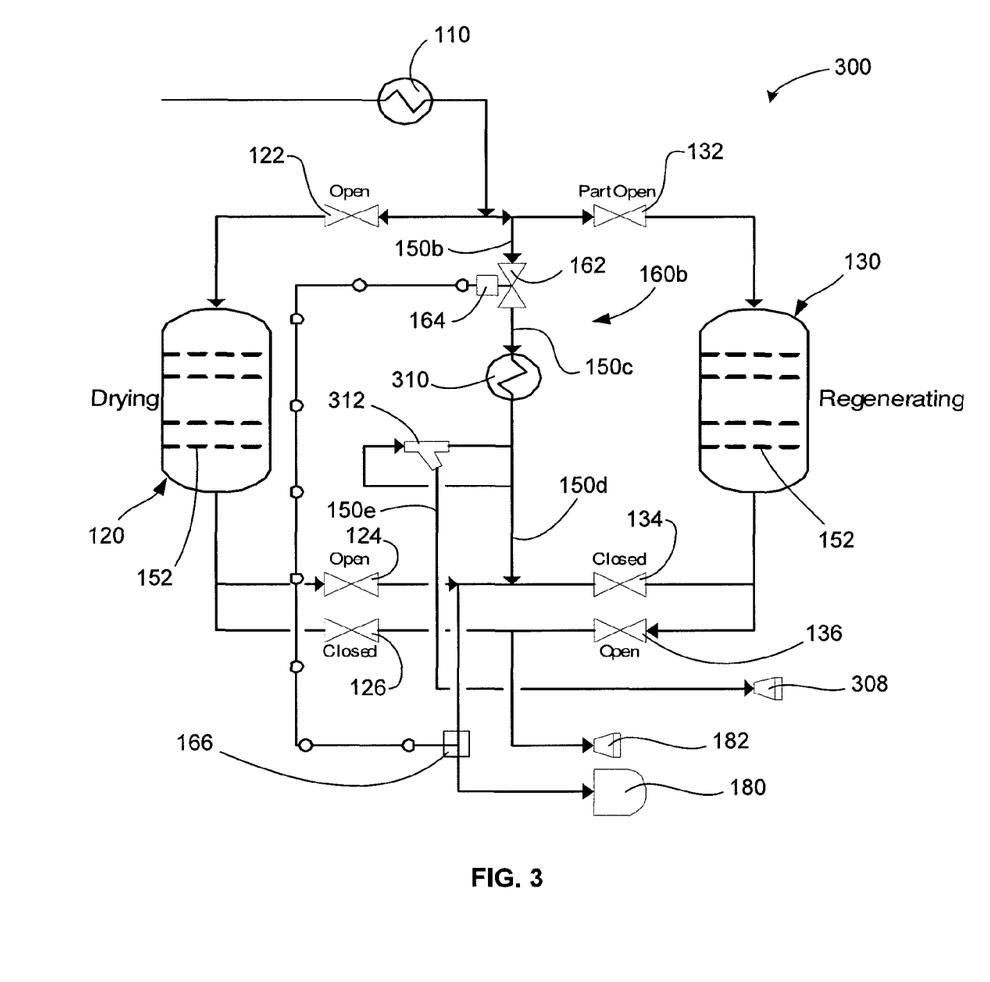
FIG. 3 is a schematic drawing outlining a regenerative air dryer with an additional cooler and a dew point feedback system, according yet another embodiment. Labels such as "open" and "closed" are used to illustrate one manner of operation.

An alternate embodiment 300 of the regenerative air dryer is shown in FIG. 3, which is different from embodiment 100 in that a dew point feedback system 160*b* may include an additional cooler 310. Some air from cooler 110 may enter the dew point feedback system through pipe 150*b* via control valve 162, while the cooler 310 may allow additional air to bypass both chambers 120, 130 and go through pipe 150*d* into the header 180. The cooler 310 may also be connected to a liquid drain 308 via a condenser 312. The condenser 312 may enable some or all of the water present in the air coming from the cooler 310 to pass through a pipe 150*e* and be drained through the liquid drain 308. By drying the bypass air with the condenser 312, the cooler 310 may further reduce the dew point of the bypass air entering the pipe 150*d*, as compared to the bypass air entering pipe 150*a* in embodiment 100 (FIG. 1). The additional cooler 310 in embodiment 300 may allow for a greater volume of air to bypass the chambers 120, 130 as compared to the embodiment 100.

Figure 4:
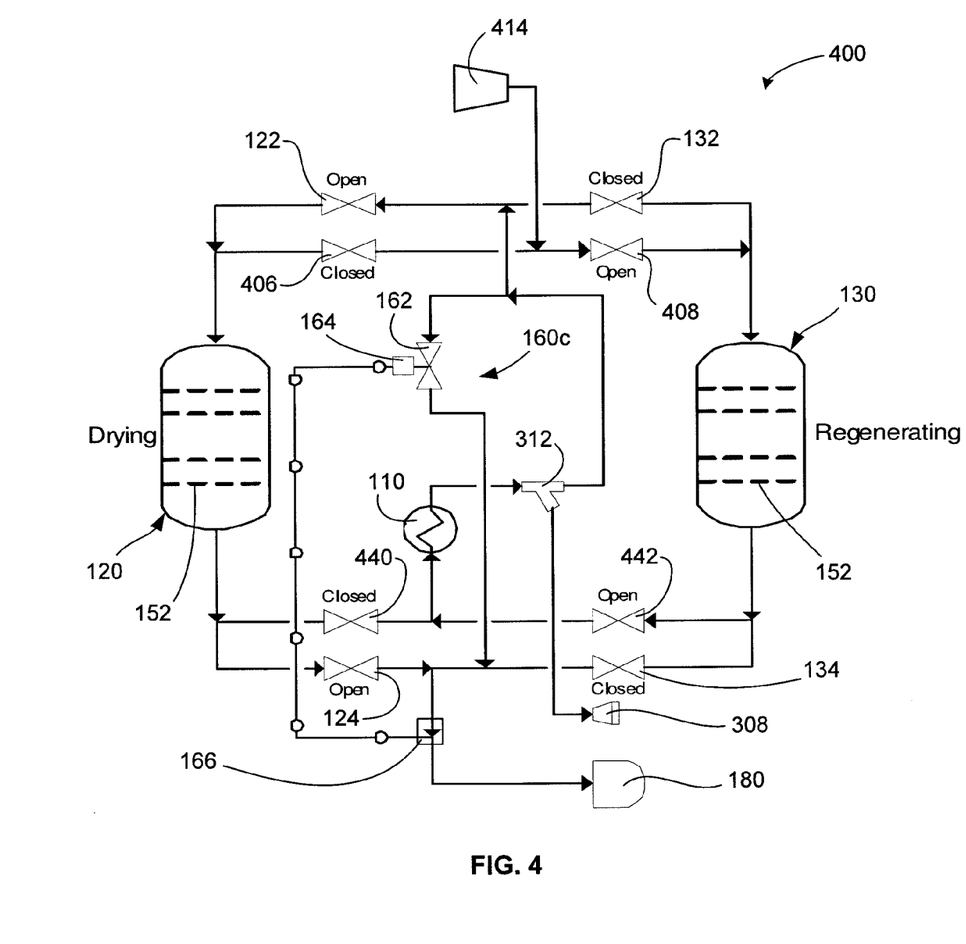
FIG. 4 is a schematic drawing showing a regenerative air dryer with a compressor and a dew point feedback system, according to still another embodiment. Labels such as "open" and "closed" are used to illustrate one manner of operation.

FIG. 4 shows another alternate embodiment 400, wherein the heat from a compressor 414 is used (without any cooler as is shown in embodiment 100) to regenerate the desiccants 152. In the art, this arrangement is often referred to as a heat of compression dryer. The cooler 110 may be in communication with a condensate collector 312 which may separate and remove some of the water present in the air stream. The water may be drained out through the liquid drain 308. The air may then pass through the control valve 122 (or 132) into the drying chamber 120 (or 130). Unlike embodiment 100 where one of valves 122, 132 remains partly open, in embodiment 400, one of valves 122, 132 will remain fully open, while the other will remain fully closed, as no compressed air from downstream of the cooler 110 is used to regenerate the desiccant 152.

The compressor 414 may be connected to the chambers 120, 130 via control valves 406, 408, and in addition to the valves 124, 134, control valves 440, 442 may be used at the output of chambers 120, 130 respectively. Where chamber 120 is drying and valve 122 is open to allow air from the cooler 110 to enter chamber 120, the valve 408 will be open to allow hot air from the compressor 414 to dry the desiccant 152 in chamber 130, while valves 132, 406 will remain closed. Valve 442 may remain open so that the hot air from the compressor 414, after regenerating the desiccant 152 in the chamber 130, can circulate and be cooled by cooler 110. Valve 440 remains closed to ensure that all the dried air reaches the header 180 through the open control valve 124.

Similarly, when chamber 120 is regenerating, valve 406 would be open to allow for the hot air from the compressor 414 to regenerate the desiccant 152, while the valve 122 will be closed to ensure that no compressed air from the cooler 410 enters the chamber 120; valve 132 would be open to allow for compressed air from the cooler 110 to enter chamber 130, while valve 408 would be closed to ensure that hot air from the compressor 414 does not enter chamber 130 while chamber 130 is drying; valve 440 would now be open so that the hot air from the compressor 414, after regenerating the desiccant 152 in the chamber 120 can be cycled through after it is cooled by cooler 110, while valve 442 would remain closed.

Akin to other embodiments, the controller 164 in a dew point feedback system 160c may open or close the control valve 162 based on dew point readings of the air being fed to the header 180, and allow for a desired amount of air to bypass either chamber 120, 130 at the drying phase and mix with the air entering the header 180 to control the dew point of air being ultimately fed to the header 180. Hot air from the compressor 414, after it interacts with and regenerates the desiccant 152, may lose some pressure; for example, when chamber 130 is regenerating, the hot air entering the chamber 130 from the valve 408 may be at a higher pressure than the air exiting the chamber 130 out of valve 442.

Figure 5:
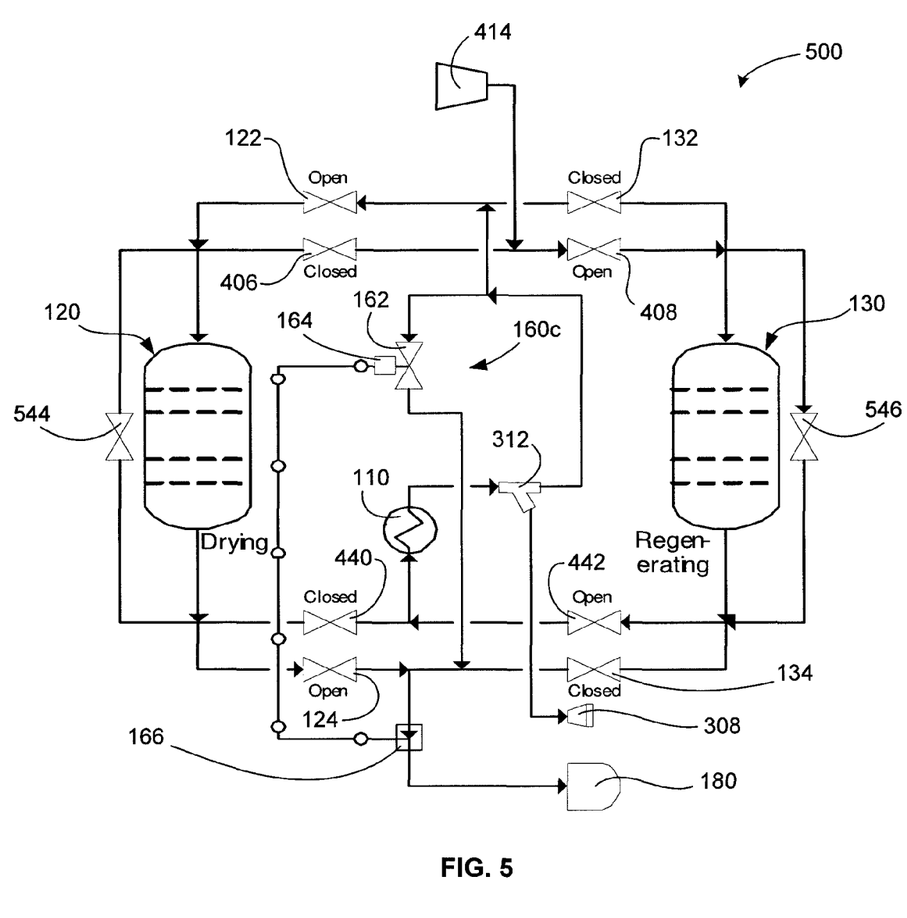
FIG. 5 is a schematic drawing outlining a regenerative air dryer with a compressor, a dew point feedback system, and additional bypass loops, according to still yet another embodiment. Labels such as "open" and "closed" are used to illustrate one manner of operation.

FIG. 5 shows an alternate embodiment 500, which functions generally in the same manner as embodiment 400, except that chambers 120, 130 each have an additional bypass control valve 544, 546 respectively to maintain the high pressure of the hot air from the compressor 414 where appropriate. In this embodiment, the dew point of the chamber 120, 130 performing the regeneration may be monitored, and once the chamber 120, 130 has reached the requisite dew point (i.e. desiccant 152 has dried to the desired level), the corresponding bypass valve 544, 546 may be opened. For instance, when chamber 130 is regenerating, the valve 408 is kept open to ensure that the hot air from the compressor can dry the desiccant 152 and then exit through the open control valve 442 and mix with the compressed air from the cooler 110. Once the chamber 130 has reached the desired dew point, bypass control valve 546 may be opened; thus, the hot air from the compressor 412 would then bypass the regenerating chamber 130 and go through open control valves 546, 442 and mix with the compressed air from the cooler 110. In this way, once the hot air from the compressor 414 is not needed to regenerate the desiccant 152 in chamber 130, the bypass control valve 546 (or 544) ensures that the pressure of the air from the compressor 414 is not needlessly wasted.

Figure 6:
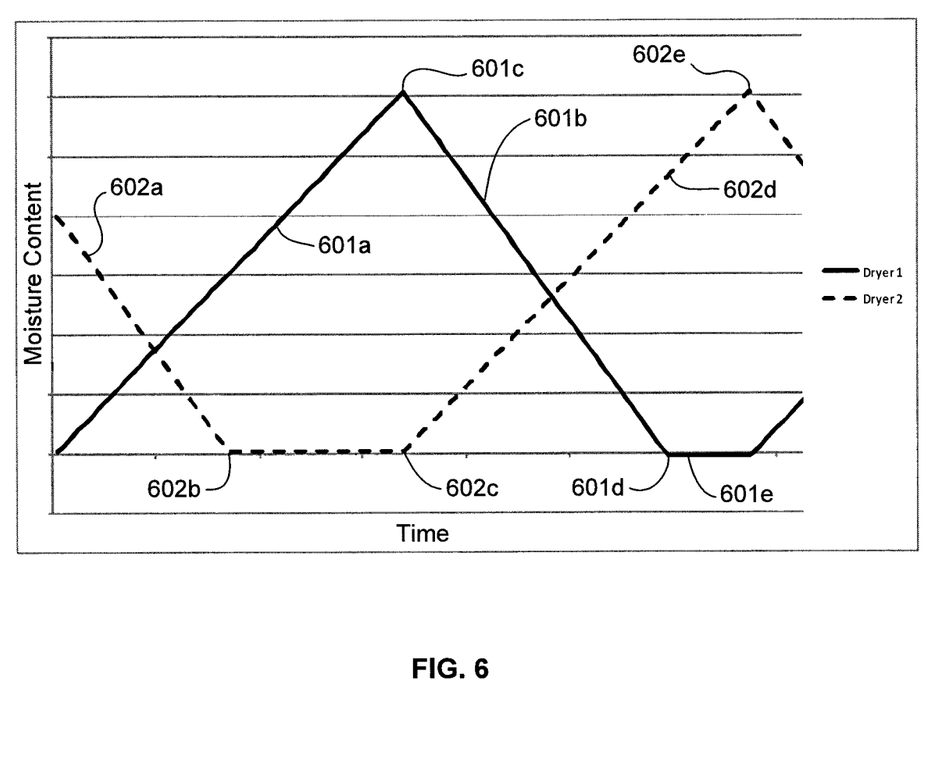
FIG. 6 is a graphical representation of the rate of moisture absorption of desiccants in chambers of a regenerative air dryer.

FIG. 6 is an exemplary graphical representation of the moisture content of chambers 120, 130 (in any of embodiments 100, 200, 300, 400, 500) over time. The solid line depicts the moisture content in chamber 120, while the dotted line indicates the moisture content in chamber 130 during the same time period. The section of the graph 601a with the positive slope indicates the time period during which the desiccant 152 in the chamber 120 is drying; thus, the moisture content in the chamber increases as more and more moisture is retained by the desiccant 152, until it reaches the point 601c and the cycle reverses. The negatively sloping section of the line 601b indicates that the chamber 120 is now regenerating, and therefore, the moisture in the chamber 120 decreases until it hits the point 601d. The flat line 601e indicates that the desiccant 152 in chamber 120 is not dried any further. It may, for example, be during the time depicted by the flat line 601e that the embodiment 500 uses the bypass valve 544 (FIG. 5) to ensure that pressure of the air from the compressor 414 is not wasted.

The negatively sloped section of the dotted line 602a indicates that the chamber 130 is regenerating, until it comes to a time represented by 602b, where more moisture from the chamber 130 is no longer removed. At point 602c, the cycle shifts, and the positively sloping line 602d indicates that chamber 130 is now drying, until point 602e.

Figure 7:
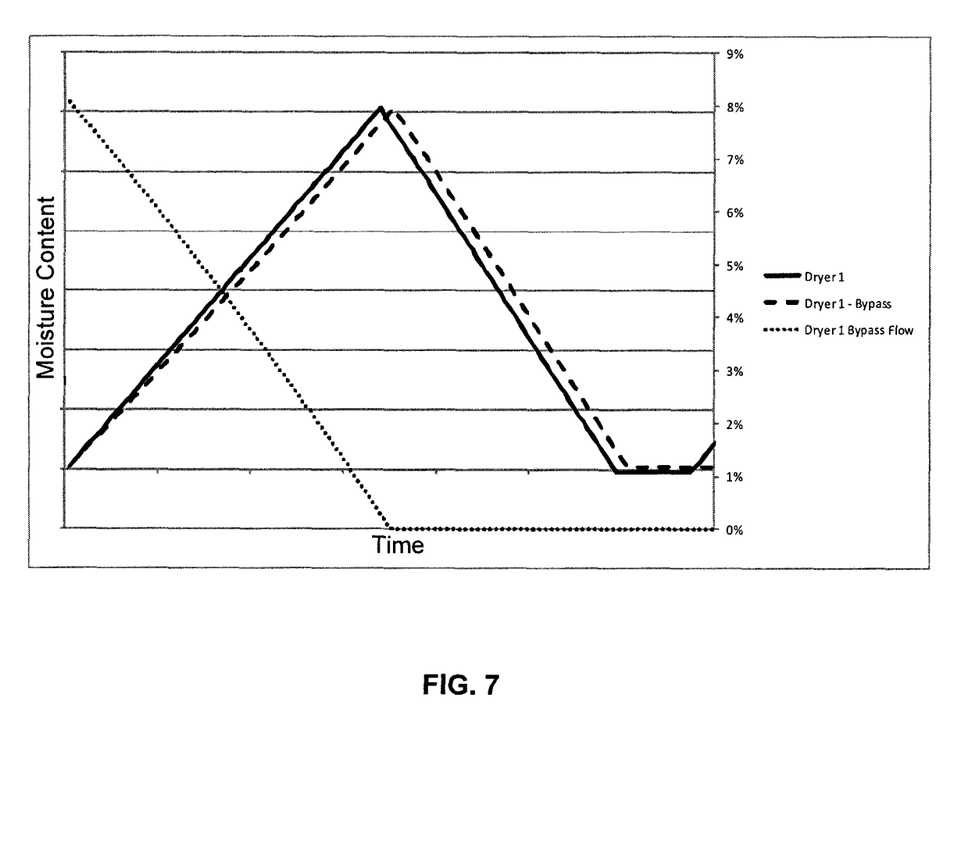
FIG. 7 is a graphical representation showing different rates of moisture absorption of desiccants.

FIG. 7 shows an advantage of using the bypass feedback system 160, with reference to FIG. 1 (though it should be appreciated that the bypass feedback systems of other embodiments may benefit in similar ways). As part of the compressed air from the cooler 110 bypasses both chambers 120, 130, the time taken by each regenerating/drying cycle increases. In other words, since some air from the cooler 110 bypasses both chambers 120, 130, a smaller volume of air per unit time enters the drying chamber 120, 130. To illustrate, where chamber 120 is drying and chamber 130 is regenerating, the amount of time before a cycle shift is limited by the moisture retained by the desiccant 152 in the drying chamber 120; once the desiccant 152 has retained water to capacity, the cycle needs to shift so as to allow the desiccant 152 in the drying chamber 120 to regenerate. As the dew point feedback system 160 bypasses some of the compressed air from entering the drying chamber 120, less compressed air enters the chamber 120 and it resultantly takes a longer time for the desiccant 152 in the chamber 120 to retain moisture to capacity. By extending the timing of each drying/regenerating cycle, the bypass feedback system 160 may require less air regenerating cycles, and less compressed air over time may have to be wasted and relieved from the vent 182. Hence, the energy requirements of a regenerative air drying system 100 with the dew point feedback system 160 may be lower than that of an air drying system that does not employ the dew point feedback system 160. The regenerative air dryer 100 may also be programmed to purge only when the desiccant 152 in the drying chamber 120 (or 130) has reached its capacity to retain water, and not on a continual basis, which may further reduce the energy requirements of the dryer 100.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A moisture control system for pressurized air, comprising:
   first and second chambers alternating between drying and regenerating phases, only one of the chambers being at the drying phase at any given point in time;
   an input providing air to the chamber at the drying phase;
   a bypass line passing air that does not pass through the chamber at the drying phase;
   a dew point feedback system for controlling the volume of air passing through the bypass line;
   a condenser in communication with the bypass line for drying air;
   a drain for draining liquid condensed by the condenser;
   a compressor for providing hot air to the chamber at the regenerating phase;
   a control valve to prevent air from directly passing from the compressor to the input providing air to the chamber at the drying phase;
   a regeneration bypass line for bypassing hot air from the compressor around the chamber at the regeneration phase after regeneration of a desiccant in the chamber at the regeneration phase is substantially complete;
   a sensor to determine when the desiccant in the chamber at the regeneration phase has been substantially regenerated;
   a regeneration bypass control valve; and
   a controller in communication with the sensor and the regeneration bypass control valve for selectively allowing hot air from the compressor to travel through the regeneration bypass line;
   wherein air exiting the chamber at the drying phase is combined with air from the bypass line to obtain air with a controlled moisture content for outputting;
   wherein air exiting the chamber at the regenerating phase passes to at least one of: the chamber at the drying phase, the bypass, and the drain; and
   wherein the hot air bypassing the chamber at the regeneration phase passes to at least one of: the chamber at the drying phase, the bypass, and the drain.

2. The moisture control system in claim 1, further comprising a cooler for cooling the air from the input; and wherein:
   the bypass line does not pass through either of the first and second chambers.

3. The moisture control system in claim 2, further comprising a vent releasing air exiting the chamber at the regenerating phase into the atmosphere.

4. The moisture control system in claim 1, wherein a volume of the air passing through the chamber at the drying phase is generally greater than a volume of the air passing through the bypass line.

5. A regenerative air dryer for feeding pressurized air with a controlled moisture content to a header, the dryer comprising:
   first and second chambers alternating between drying and regenerating phases, one of the chambers being at the drying phase while the other chamber is at the regenerating phase;
   a controller programmed to switch the phase of the chambers between drying and regenerating when desiccant in the chamber at the drying phase has retained water to a predetermined capacity;
   a bypass line bypassing the first and second chambers;
   an input providing air to the chamber at the drying phase and to the bypass line;
   a dew point feedback system controlling a volume of air passing through the bypass line;
   means for combining air from the bypass line with air exiting the chamber at the drying phase to provide air with a controlled dew point to the header;
   a control valve to prevent air from the input from directly passing through the chamber at the drying phase; and
   a condenser in communication with the bypass line to condense the moisture present in the air passing through the bypass line.

6. The regenerative air dryer in claim 5, wherein:
   the input provides air to the chamber at the regenerating phase;
   a volume of the air provided to the chamber at the drying phase is substantially greater than a volume of the air provided to the chamber at the regenerating phase; and
   the volume of air provided to the chamber at the drying phase is substantially greater than a volume of the air provided to the bypass line.

7. The regenerative air dryer in claim 5, further comprising:
   a blower for providing air to the chamber at the regenerating phase;
   a heater for heating air from the blower; and
   a vent releasing at least a portion of the air from the blower into the atmosphere.

8. The regenerative air dryer in claim 5, wherein the input provides air to at least one of:
   (a) the chambers at the regenerating phase; and
   (b) the bypass before the air is provided to the chamber at the drying phase.

9. The regenerative air dyer in claim 5, wherein:
   the input includes a compressor and a cooler; and
   the input directly provides air to the chamber at the regenerating phase and the chamber at the drying phase.

* * * * *